United States Patent [19]
Dolgolenko et al.

[11] 3,744,619
[45] July 10, 1973

[54] AIR CUSHIONED BELT CONVEYOR

[76] Inventors: Anatoly Alexandrovich Dolgolenko; Pavel Pavlovich Onokhov; Jury Meerovich Makhover, all of 8 Sovetskaya ulitsa, 17/19, kv. 16, Leningrad, U.S.S.R.

[22] Filed: Apr. 11, 1972

[21] Appl. No.: 242,953

[52] U.S. Cl. ............................................. 198/184
[51] Int. Cl. ............................................ B65g 15/28
[58] Field of Search ..................... 198/184; 302/11, 302/22

[56] References Cited
UNITED STATES PATENTS
756,600   4/1904   Dodge............................ 198/184 X

*Primary Examiner*—Edward A. Sroka
*Attorney*—Holman & Stern

[57] ABSTRACT

The conveyer comprises a flexible belt whose load side is confined in a trough which is made closed at its top and ends, and is connected at its bottom to the pressure port of a fan, and at its top, in the place where the material is discharged, to the suction port of said fan, thus preventing the upper layer of the conveyed dusty material from being blown off.

3 Claims, 1 Drawing Figure

PATENTED JUL 10 1973 3,744,619
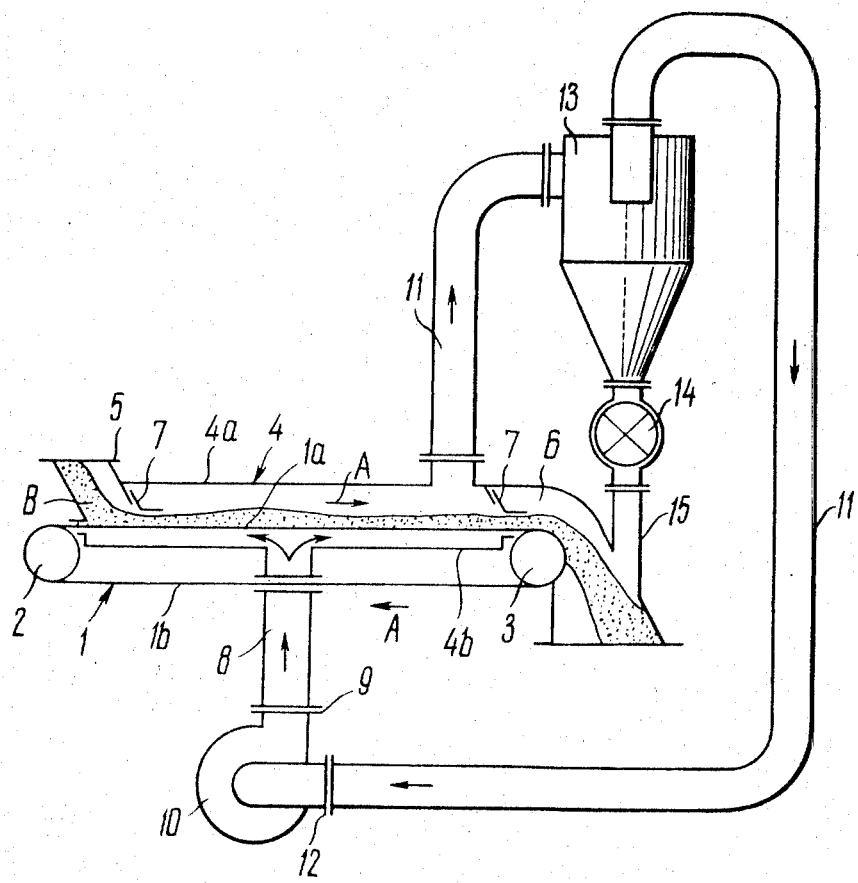

AIR CUSHIONED BELT CONVEYOR

The invention relates to conveyers, and more specifically to an air-cushioned belt conveyer.

The present invention can be most advantageously utilized for horizontal and smoothly inclined transportation of loose materials in the chemical, mining, and metallurgical industries, particularly such powdered materials whose transportation is accompanied with strong dusting caused by the upper layers of the material being carried away (blown off) by the reverse air flow.

Such a conveyer can be equally employed to transport toxic materials.

Known in the art are air-cushioned belt conveyers wherein the load side of the belt moves in a covered trough. This trough is at its bottom connected to the pressure port of a fan which delivers compressed air to between the load side of the belt and the trough, to form therebetween an air cushion keeping the belt in suspended condition.

Location of the belt load side in a covered trough when transporting loose dusty materials prevents the dust from spreading to the environment all along the conveyer.

However, this does not prevent the upper layer of the powdered material from being blown off the moving conveyer belt by the reverse air flow, which intensifies dusting in the places where the material is charged and discharged.

It is the object of the present invention to provide an air-cushioned belt conveyer for transporting dusty and toxic materials at great speed without their upper layer being carried away by the reverse air flow.

This object is achieved by means of an air-cushioned belt conveyer wherein the load side of the belt moves in a covered trough which is connected at its bottom to the pressure port of a fan.

According to the invention, this trough is also closed at its ends, and at its top, in the place where the material is discharged, it is connected to the suction port of the fan, to create within the trough over the load side of the belt an air flow concurrent with the movement of the latter, for preventing the upper layer of the conveyed material from being blown off.

It is advantageous to mount flexible aprons at the trough ends, where the material is charged and discharged, so as to seal off the trough.

It is also advisable to place an air cleaner between the trough and the suction port of the fan.

This will preserve the fan from penetration thereinto of the dust particles of the conveyed material.

Following is a detailed description of the invention with references to the appended drawing which gives a schematic representation of a horizontal air-cushioned belt conveyer.

The belt conveyer comprises an endless flexible belt 1 passing about a driving drum 2 and a tension drum 3 which are mounted on a basement or frame (not shown). According to the invention, the load side 1a of this belt is disposed in a trough 4 which is closed both at top, and at its ends, and is connected at one end with a feed box 5, and at the other end with a discharge bunker 6. The slack side 1b of belt 1 moves on roller supports (not shown).

Mounted in the ends of trough 4, where the material is charged and discharged, are flexible aprons 7.

In its lower part 4b under the load side 1a of belt 1 the trough 4 is connected by an air duct 8 connected to the pressure port 9 of a fan 10, while its upper part 4a, at the place of the material discharge, is connected through an air duct 11 to the suction port 12 of the same fan 10.

Between trough 4 and the suction port 12 of fan 10, within the air duct 11, there is placed an air cleaner 13 with a lock gate 14 which is connected through a pipe 15 with the discharge bunker 6.

The belt conveyer operates as follows.

With the driving drum 2 being switched on, the load side 1a of the conveyer belt 1 starts moving in the direction of arrow A.

The conveyed loose material B is supplied onto the load side 1a of belt 1 through the feed box 5, and moves together therewith to the discharge bunker 6.

Switched on simultaneously with the driving drum 2 is fan 10 which through the air duct 8 feeds compressed air into the slit space between the bottom of trough 4 and the load side 1a of the conveyer belt 1, thus producing thereunder an air cushion which keeps the load side 1a of belt 1 in suspended condition. This reduces the resistance to the movement of belt 1, and makes it run more smoothly, which extends the life of the conveyer as a whole.

From under the load side 1a of the conveyer belt 1 the air enters the space of trough 4 over the conveyed material B, wherefrom the air is sucked away by fan 10 via duct 11. As a result, an air flow concurrent with the movement of belt 1 (its direction being shown at A) is created over the material B. The speed of this flow is near to that of the conveyer belt 1, which almost completely prevents the upper layer of the conveyed material B from being blown off.

The dust particles of the material getting into the air duct 11 are settled in the air cleaner 13, and through its lock gate 14 are delivered into the discharge bunker 6, thus avoiding fouling of fan 10.

This closed system of air movement inside trough 4 rules out spreading of the dust particles of the conveyed material to the environment, which improves working conditions for the personnel, and employment of one fan simplifies operation of the conveyer and reduces its cost price by about 20 percent.

What we claim is:

1. An air-cushioned belt conveyer, comprising: a driving drum; a tension drum; a flexible endless belt passing about said drums, and moved by said driving drum; a trough disposed around the load side of said belt carrying the material to be conveyed, which trough is closed at its top and ends; and a fan having a pressure port connected to the bottom of said trough to create an air cushion under said load side of the belt, the top of said trough, at the place where the material is discharged, being connected to the suction port of said fan to create within the trough over said load side of the belt an air flow concurrent with the movement of the belt and preventing the upper layer of the conveyed material from being blown off.

2. A conveyer as in claim 1, in which flexible aprons are mounted at the end of said trough where the material is charged and discharged.

3. A conveyer as in claim 1, in which an air cleaner is placed between said trough and the suction port of said fan.

* * * * *